(12) United States Patent
Smart et al.

(10) Patent No.: US 10,839,651 B2
(45) Date of Patent: Nov. 17, 2020

(54) ARCADE GAME WITH RFID READER

(71) Applicant: Smart Industries Corporation, Des Moines, IA (US)

(72) Inventors: Jeffrey T. Smart, Altoona, IA (US); Jeremy Wade, Bradenton, FL (US); Loren Ostema, Sarasota, FL (US); Clarence W. Mabe, Gray, TN (US)

(73) Assignee: Smart Industries Corporation, Des Moines, IA (US)

( * ) Notice: Subject to any disclaimer, the term of this patent is extended or adjusted under 35 U.S.C. 154(b) by 0 days.

(21) Appl. No.: 15/809,319

(22) Filed: Nov. 10, 2017

(65) Prior Publication Data
US 2018/0137718 A1  May 17, 2018

Related U.S. Application Data

(60) Provisional application No. 62/421,009, filed on Nov. 11, 2016.

(51) Int. Cl.
*G07F 17/32* (2006.01)
*G06K 7/10* (2006.01)
*A63F 9/24* (2006.01)
*A63F 9/30* (2006.01)

(52) U.S. Cl.
CPC .......... *G07F 17/3297* (2013.01); *A63F 9/24* (2013.01); *A63F 9/30* (2013.01); *G06K 7/10425* (2013.01); *G07F 17/3209* (2013.01); *G07F 17/3213* (2013.01); *G07F 17/3216* (2013.01); *G07F 17/3244* (2013.01); *G07F 17/3253* (2013.01); *A63F 2009/2489* (2013.01)

(58) Field of Classification Search
CPC ...... A63F 9/30; A63F 9/24; A63F 2009/2489; G07F 11/165; G07F 1/3297; G06K 7/10425
See application file for complete search history.

(56) References Cited

U.S. PATENT DOCUMENTS

| 5,271,628 | A | * | 12/1993 | Okada | A63F 9/30 221/210 |
| 5,711,530 | A | * | 1/1998 | Lewis | A63F 9/30 273/448 |
| 5,855,375 | A | * | 1/1999 | Wilcox | F16J 15/322 277/551 |

(Continued)

OTHER PUBLICATIONS

Ticket-Smarts, https://www.youtube.com/watch?v=DMW_kY07vDs, published on Nov. 2, 2016, viewed on internet on Jul. 22, 2019.

(Continued)

*Primary Examiner* — Melba Bumgarner
*Assistant Examiner* — Amir A Klayman
(74) *Attorney, Agent, or Firm* — McKee, Voorhees & Sease, PLC (57) ABSTRACT

A crane-style arcade game has an enclosed prize chamber wherein the prizes comprise RFID tags with assigned point values. an RFID reader reads the RFID tag on a captured prize as the captured prize is moved past the RFID reader. A recording device is connected to the RFID reader to record the assigned point values of the RFID tags of captured prizes read by the RFID reader. A rotary table mechanism is used to move a captured prize past the RFID reader and then to a storage area below the enclosed prize chamber.

10 Claims, 9 Drawing Sheets

(56) References Cited

U.S. PATENT DOCUMENTS

| | | | | |
|---|---|---|---|---|
| 5,857,674 | A * | 1/1999 | Legrand | A63F 3/00145 |
| 6,283,475 | B1 | 9/2001 | Stubben | |
| 6,634,940 | B2 * | 10/2003 | Yoshida | A63F 9/30 |
| | | | | 221/210 |
| 6,770,001 | B1 | 8/2004 | Shoemaker, Jr. | |
| 6,976,589 | B2 * | 12/2005 | De Raedt | G07F 17/322 |
| | | | | 209/552 |
| 6,991,230 | B1 | 1/2006 | Shoemaker | A63F 9/02 |
| | | | | 273/108 |
| 7,513,505 | B2 * | 4/2009 | Berman | G07F 17/32 |
| | | | | 273/355 |
| 7,549,266 | B2 * | 6/2009 | Yuyama | G07F 11/165 |
| | | | | 53/168 |
| 7,562,791 | B2 * | 7/2009 | Yuyama | B65B 5/103 |
| | | | | 221/197 |
| 7,783,383 | B2 * | 8/2010 | Eliuk | A61J 1/20 |
| | | | | 141/1 |
| 7,857,316 | B2 * | 12/2010 | Shoemaker, Jr. | A63F 9/0247 |
| | | | | 273/317 |
| 7,857,318 | B1 * | 12/2010 | Shoemaker, Jr. | A63F 9/30 |
| | | | | 273/447 |
| 8,251,369 | B2 | 8/2012 | Verstraeten | |
| 8,579,733 | B2 * | 11/2013 | McGrath | A63F 9/30 |
| | | | | 473/447 |
| 9,135,403 | B1 * | 9/2015 | Tolmosoff | G06F 19/3462 |
| 9,153,092 | B2 * | 10/2015 | Lachance | G07F 17/3204 |
| 9,552,703 | B2 * | 1/2017 | Shoemaker, Jr. | G07F 17/3297 |
| 9,697,685 | B1 | 7/2017 | Al-Saleh | G07F 17/3244 |
| 9,754,456 | B2 * | 9/2017 | Verstraeten | G07F 17/38 |
| 10,105,583 | B2 * | 10/2018 | Deveaux | A63F 9/02 |
| 10,252,149 | B2 | 4/2019 | Huang | G07F 11/44 |
| 10,307,665 | B2 * | 6/2019 | Chu | A63F 9/30 |
| 10,417,466 | B2 * | 9/2019 | Bergant | A63F 9/0468 |
| 10,565,830 | B1 * | 2/2020 | Georgilas | G07F 17/3267 |
| 2002/0067002 | A1 * | 6/2002 | Yoshida | A63F 9/30 |
| | | | | 273/447 |
| 2004/0048659 | A1 | 3/2004 | Seelig et al. | |
| 2005/0119041 | A1 | 6/2005 | Berman et al. | |
| 2006/0170164 | A1 * | 8/2006 | Watanabe | A63F 9/30 |
| | | | | 273/447 |
| 2008/0048869 | A1 * | 2/2008 | Wang | G09B 19/06 |
| | | | | 340/572.8 |
| 2008/0182643 | A1 * | 7/2008 | Seelig | G07F 17/3202 |
| | | | | 463/20 |
| 2009/0191931 | A1 * | 7/2009 | Peck | G07F 17/32 |
| | | | | 463/7 |
| 2009/0218393 | A1 * | 9/2009 | Huang | G06K 7/0008 |
| | | | | 235/375 |
| 2010/0090408 | A1 * | 4/2010 | Fukazawa | A63F 9/30 |
| | | | | 273/447 |
| 2010/0145507 | A1 * | 6/2010 | Blust | G07F 11/165 |
| | | | | 700/232 |
| 2010/0287880 | A1 * | 11/2010 | Yasunaga | A61J 7/0084 |
| | | | | 53/64 |
| 2011/0180998 | A1 * | 7/2011 | Verstraeten | A63F 9/30 |
| | | | | 273/447 |
| 2011/0272887 | A1 | 11/2011 | McGrath | |
| 2015/0018058 | A1 * | 1/2015 | Sato | G07F 17/3216 |
| | | | | 463/7 |
| 2015/0060482 | A1 * | 3/2015 | Murray | A47J 31/404 |
| | | | | 222/1 |
| 2016/0140811 | A1 | 5/2016 | Verstraeten | |
| 2018/0028905 | A1 * | 2/2018 | Shoemaker, Jr. | A63F 9/30 |

OTHER PUBLICATIONS

Unknown, "What Time Is It? It's Ticket Time!", RePlay Magazine, Product Feature, 2 pages, Nov. 2016.

\* cited by examiner

ARCADE GAME WITH RFID READER

CROSS REFERENCE TO RELATED APPLICATION

This application claims priority under 35 U.S.C. § 119 to provisional application Ser. No. 62/421,009 filed Nov. 11, 2016, the entire contents of which are hereby incorporated by reference.

FIELD OF THE INVENTION

The invention relates generally to arcade games. More specifically, the invention relates to crane-style arcade games.

BACKGROUND OF THE INVENTION

Crane-style arcade games have an electronic control system and a mechanical system that allows a player to purchase a chance to win a prize by skillful manipulation of player controls. The controls include a joystick and/or buttons. These controls allow the player to move a crane head in front/back and left/right directions above a supply of prizes and then drop a claw which will pick up prize merchandise if skillfully and properly manipulated. When the claw drops to the bottom of its travel, the electronic control system closes the claw. The closing of the claw may grasp one or more prizes, or may remain empty. The control system then raises the claw, positions it over a prize delivery shoot and releases any prizes held by the claw. Motors are used to move the crane head and to move the claw up and down. The claw is activated by a solenoid. The equipment operator can preset the nominal strength of the claw solenoid to adjust the skill level required to win. A stronger force applied by the claw generally increases the chances that a prize will be grasped; whereas a lower force makes winning prizes more difficult. Operators will therefore set the gripping strength at a level that maximizes profit by rewarding play without costing too much in prizes. The strength level may be variable within a session to encourage repeated play, for example by increasing as more money is spent on playing.

Traditionally, crane-type arcade games are filled with a number of different prizes, toys or other novelty items. For example, the game may include stuffed animals, sport balls, baseball hats, plastic football/baseball helmets, stickers, jewelry, etc. The user would then manipulate the crane or arm as described above over the desired prize within the game and elect to deploy the crane or arm to try and grab the prize. If the crane successfully picked up the prize, the prize would be dispensed to the user/player. The user could then make use of the item they won.

However, developments in the arcade gaming industry have led to changes in how prizes are managed and the types of prizes included in many arcades. One common arrangement is for players to be awarded tickets by various games within an arcade. A player can accumulate tickets from many different arcade games, and then redeem the tickets for a variety of prizes that are assigned ticket values. For this reason, crane games have been developed where the prizes, such as toys and novelty items have been replaced by rolls of tickets or other physical items that are marked with a ticket value. However, these tickets or may be lost, stolen, or misplaced. Furthermore, there is a need to store at the validation site and return the tickets to the machine at a later time. Due to be handled by users the tickets tend to rather quickly degrade and become unusable, requiring frequent replacement of the tickets.

Therefore, there remains a need in the art for an apparatus and/or method for efficiently and economically managing various types of prizes within the industry.

SUMMARY OF THE INVENTION

Therefore, it is a primary object, feature, and/or advantage of the invention to improve on and/or overcome the deficiencies in the art.

According to one embodiment, the present invention relates to a crane-style arcade game that has an enclosed prize chamber in a housing including a floor for supporting prizes. The prizes have RFID tags with assigned point values. A grabber mechanism is suspended above the floor. A controller is located externally on the housing and has a connection to the grabber mechanism to permit a player to control a position of the grabber mechanism above the floor whereby the player attempts to capture a prize from the prize chamber with the claw and drop the prize into an opening in the floor. An RFID reader associated with the opening in the floor reads the RFID tag on a captured prize as the captured prize is moved past the RFID reader. A recording device connected to the RFID reader records the assigned point values of the RFID tags of captured prizes read by the RFID reader. The controller may be adapted to drop the prize into the opening in the floor by releasing the prize from the claw when the grabber mechanism is above the opening. The crane-style arcade game may also include a captured-prize storage area below the floor and a delivery passage within the housing in communication between the opening in the floor and the captured-prize storage area. The captured-prize storage area may be entirely enclosed within the housing. The crane-style arcade game may also have a rotary unit within the delivery passage, with the rotary unit positioned in communication with the opening in the floor to move the captured prizes past the RFID reader towards the captured-prize storage area. The rotary unit may include a rotary table guide, wherein the rotary table guide has: (a) a rotary guide base having an aperture proximate to the center of the rotary guide base; (b) one or more interior walls positioned within the aperture of the rotary guide base, the interior walls being configured to define the aperture into quadrants; (c) one or more doors operatively attached to the one or more interior walls; (d) an exterior wall attached proximate to an outer edge of the aperture; and (e) a sloped portion of the rotary guide base configured to funnel a captured prize to the aperture. The rotary unit may also include a rotary base having (a) a rotary table base; (b) a motor; (c) a hub assembly positioned above the rotary base and operatively attached to the motor; and (d) one or more arms extending from the hub assembly. The RFID reader may be attached proximate to the rotary table base. The motor may be configured to rotate the hub assembly and the one or more arms to move the captured prize about the rotary table, whereby the RFID reader reads the RFID tag on the captured prize. The recording device may be adapted to record point values to a user's memory card. The prizes may be rolls of ticket. The point value assigned to each RFID tag may correspond with a number of tickets in the ticket roll to which the RFID tag is attached.

According to another embodiment, the present invention is a rotary base for an arcade game. The rotary table guide includes a rotary guide base having an aperture proximate to the center of the rotary guide base. One or more interior walls are positioned within the aperture of the rotary guide base and define the aperture into quadrants. One or more doors are operatively attached to the one or more interior walls. An exterior wall is attached proximate to an outer edge of the aperture. A sloped portion of the rotary guide base is configured to funnel an item to the aperture. A rotary table is positioned below the rotary table guide. The rotary table has: a rotary table base; a motor; a hub assembly positioned above the rotary base and operatively attached to the motor; and one or more arms extending from the hub assembly. The rotary base may also include an RFID reader attached proximate to the rotary table base. The motor may be configured to rotate the hub assembly and the one or more arms to move an item having an RFID tag about the rotary table, whereby the RFID reader may identify the item from the RFID tag. The one or more doors may be configured to separate and position one or more items flatly on the rotary table base. The one or more arms may be bent, curved, and/or angled to allow the one or more arms to cradle one or more items placed on the rotary table base as the hub assembly is rotated.

According to another embodiment, the present invention is a method of operating an arcade game by placing one or more prizes each having an RFID tag on a rotary base that has a hub assembly and one or more arms extending from the hub assembly. An RFID reader is attached proximate to the rotary base. The hub assembly is rotated to move the one or more prizes along the rotary base, wherein the RFID tag on each of the one or more prizes may be read by the RFID reader. The RFID tag on each of the one or more prizes may be assigned a point value and the RFID reader may be configured to calculate the point value of the RFID tag on each of the one or more prizes that is read by the RFID reader. The prizes may be rolls of tickets and the point value of each RFID tag corresponds with a number of tickets in the roll to which each RFID tag is attached.

It is still yet a further object, feature, and/or advantage of the invention to provide an arcade game wherein the one or more items or prizes are completely enclosed within the housing during game play.

These and/or other objects, features, and advantages of the invention will be apparent to those skilled in the art. The invention is not to be limited to or by these objects, features and advantages. No single embodiment need provide each and every object, feature, or advantage.

BRIEF DESCRIPTION OF THE DRAWINGS

FIG. 12 is a perspective view of a crane-style game cabinet including the rotary unit installed in the base of the cabinet.

DETAILED DESCRIPTION

The invention is directed towards an arcade game 10, and more specifically but not exclusively toward a crane-style arcade game. Unlike traditional crane-style games, the game 10 of FIG. 1 does not include a chute for a player to retrieve a prize that has been grasped and released by the crane. Instead, the prizes remain in the housing. Each prize includes an RFID marker and that gets read by an RFID reader. After a prize is "won" by being grasped by the crane, the prize value is read by the RFID reader and credited to the player.

Figure 1:
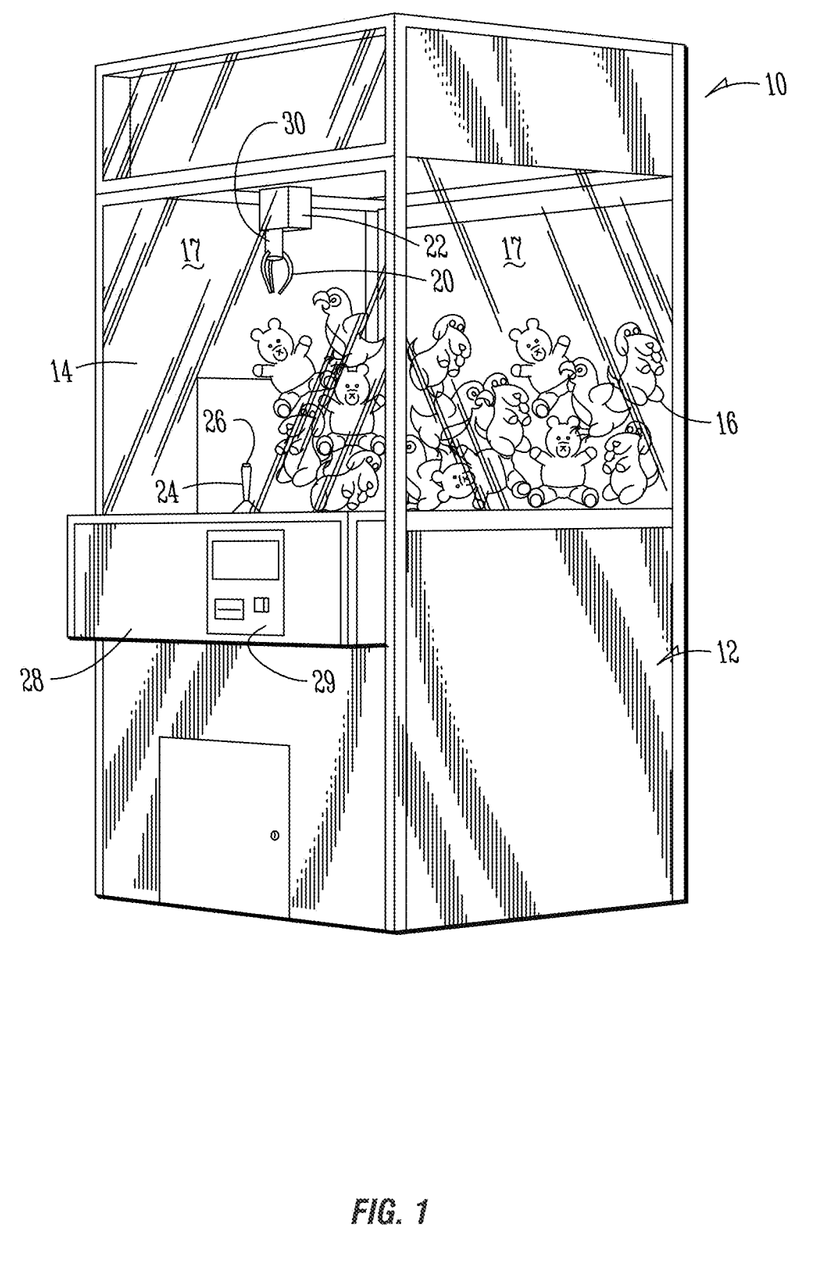
FIG. 1 is a perspective view of a crane-style game according to one embodiment of the present invention.

Referring to FIG. 1, a crane game 10 is shown. A crane-style game may include a housing 12 that defines an enclosed chamber 14 with prizes 16 inside distributed therein. While the prizes 16 shown in FIG. 1 are shown as stuffed animals, other types of prizes are also contemplated, including specifically rolls of tickets. Transparent windows 17 of housing 12 may allow a player to view prizes 16 without having direct access to them. A claw 20 or other grabbing mechanism is connected to a crane 22. The claw 20 may include a number of different types of grabbing mechanisms. For example, the claw 20 may include a magnet, arms, fingers, pincher, or similar mechanism for grabbing or attaching to a prize 16 within the chamber 14. As is well-known in the art, a player control 24 (e.g. joy stick, arrow buttons, keypad) is used by a player to move the crane 22 in an x-y plane (generally horizontal) relative to the prizes 16 within chamber 14. The player selects a prize(s) 16 that they hope to collect and attempts to position the claw 20 vertically over the selected prize(s) 16. Another manual player control, such as button 26 causes the crane 22 to drop claw 20 down with the claw jaws open, close the jaws, and lift claw 20 upward. The button 26 may be part of or incorporated into the player control joy stick 24 if the skill of the operator at positioning claw 20 is successful and the claw 20 drops in such a position that its jaws grasp at least a portion of prize 16, and the jaws grasping strength is sufficient to hold prize 16 when lifted, the operator either moves crane 22 to a position, or game 10 automatically moves crane 22 to a position where claw 20 would open and drop prize 16. A solenoid 30 controls the opening and closing of the claws 20, and may be of variable strength to make holding on to prizes easier or more difficult depending on a desired winning percentage. These features are shared by many traditional crane-style games as shown and described in U.S. Pat. Nos. 6,283,475 and 8,251,369, which are herein incorporated by reference in their entirety.

A payment handler 29, such as a coin receiver and changer or a card reader and writer, is incorporated on a console 28. A player deposits an appropriate amount of money, or has an appropriate amount of money or credit deducted from a card, to have a chance at obtaining a prize 16. The game may also be activated by RFID, which may include a number of credits or points that are subtracted with each play of the game 10.

Unlike traditional crane-style games, the game 10 of FIG. 1 does not include a chute for a player to retrieve a prize 16 that has been grasped and released by the crane 22. Instead, the prizes 16 remain in the housing 12. Each prize 16 includes an RFID tag 102 (see FIG. 13) and that gets read by an RFID reader 82 (FIGS. 2-7, 11, and 12).

Referring to FIGS. 2-7, a rotary unit 40 is installed in the housing 12 of an arcade game 10 is shown. The rotary 40 unit may be sized or retrofitted to fit within any arcade game 10. The rotary unit 40 includes a rotary table guide base 50 (see FIG. 9). The guide base 50 rests on a support platform 70 (see FIG. 10). Rotary arms 74 rotate at the bottom of the guide base 50 to move a selected prize 17 past the RFID reader 82 and then to aperture 78 in the support platform 70 where the selected prize 17 drops into a holding area 88.

Figure 3:
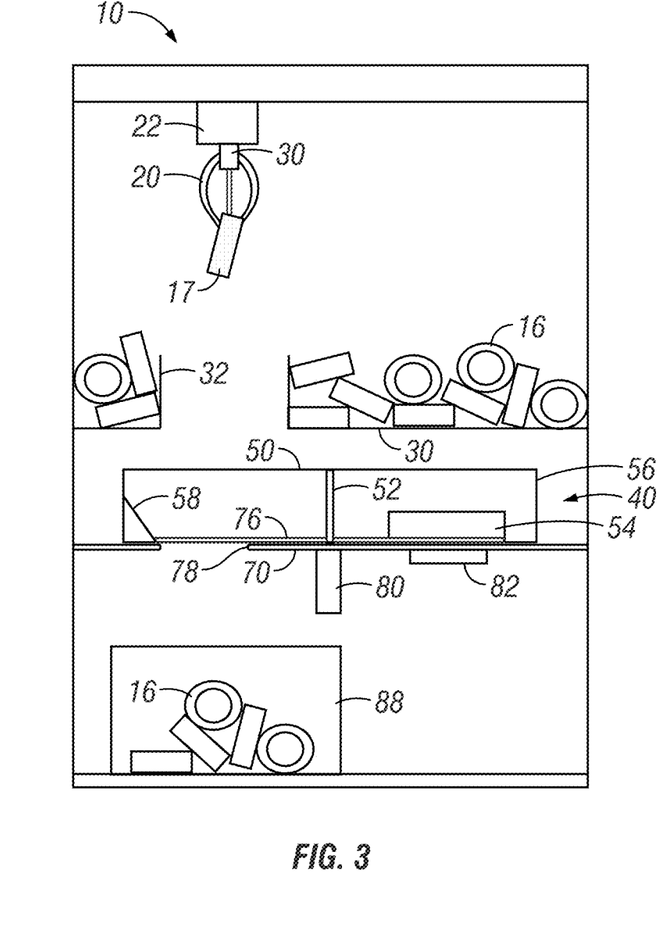
FIG. 3 is the crane-style game of FIG. 2 wherein the crane has picked up a prize that has an RFID tag attached.
Figure 9:
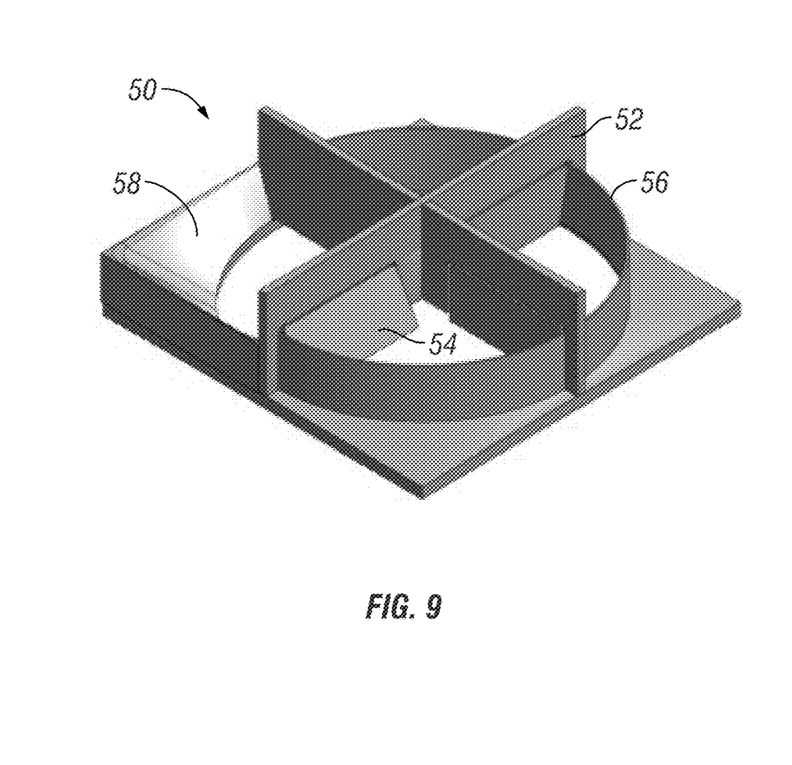
FIG. 9 is a perspective view of a rotary table guide according to one embodiment of the present invention.

With reference to FIG. 9, the rotary table guide 42 may include a guide base 50 that has both flat and angular portion(s) 58. The base 50 may also include an aperture located proximate to the center of the base 50. Extending from or attached to the base 50 are outer walls 56 and interior walls 52. The outer walls may be attached proximate to the outer edge of the aperture in the base 50. The outer wall 56 may extend in a generally vertical direction or may extend upward and outward from the base 50 to create a funnel like effect to the aperture. Interior wall(s) 52 may extend in a generally vertical direction or may be angled to funnel an item to a particular quadrant 55A, 55B, 55C, 55D of the aperture in the base 50. The interior wall(s) 52 may also include cut-out portions that act as guides to orient and singulate prizes that are on the rotary base 72 as they are moved through the walls 52. The interior walls 52 may include a door 54 or flap at the cut-out portions. The door 54 may be attached to the interior wall 52 by a hinge, pin, or other similar mechanical device for attaching a swing door or flap. The door(s) 54 may be configured to rotate about a generally vertical or a generally horizontal axis. The example embodiment in FIG. 3 represents a rotary table guide 42 that includes four interior walls 52, three of which have doors 54. The rotary table guide 42 of FIG. 3 also includes an angled portion 58 of the base 50. The angled portion 58 may be configured to funnel an item or object into quadrant 55D of the aperture of the base 50 that is defined by the interior walls 52. This will be explained in greater detail below. A rotary base 72 may be placed on top of the rotary platform 70 with an aperture or cutout portion 73 located in the first quadrant 55A of the rotary table guide 42. Prizes 16 may be stored within the chamber 14 on top of the floor member above the rotary table guide 42.

Figure 10:
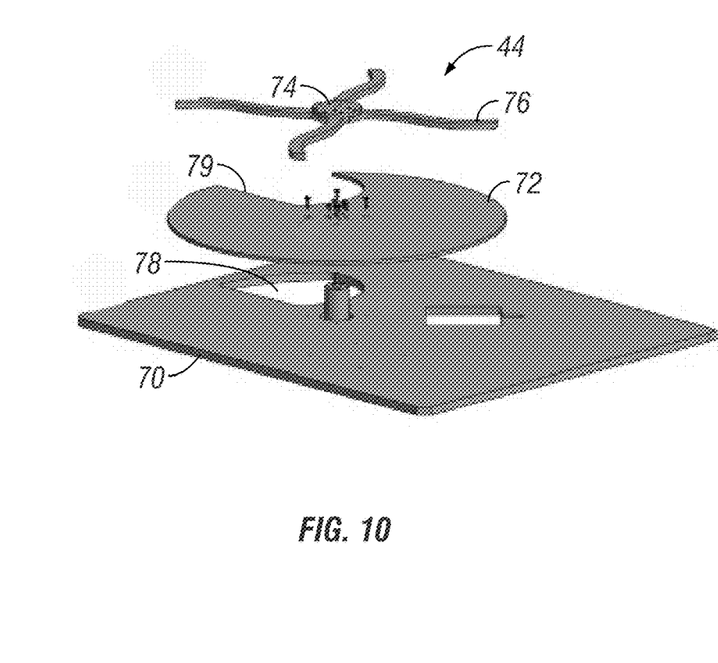
FIG. 10 is an exploded view of a rotary table base according to one embodiment of the present invention.

Referring to FIG. 10, an example embodiment of a rotary table 44 is shown. The rotary table 44 is configured to be positioned below the rotary table guide 50. One or more apertures 78 may be cut in the platform/floor 70 of the chamber 14. The aperture 78 may be configured to create an opening to permit a selected prize to fall to the holding area 88. Apertures may also be provided to mount a motor 80, mount an antenna 86, and/or mount an RFID reader 82 or similar scanning and sensor-type mechanism. The RFID reader 82 may be attached to the platform 70 by one or more mounting brackets (not shown). On top of the platform is the rotary base 72. The rotary base 72 may have an outer radius approximately the size of the aperture in the rotary table guide 42. The rotary base 72 may also include a cutout portion 79. The cutout portion 79 is configured to align with the aperture 78 in the platform 70 configured to receive a prize 16 or other item. However, the base may be stationary and the shaft of the motor 80 configured to pass through the rotary base 72. On top of the rotary base 72 may be a rotary arm hub assembly 74 comprising one or more arm portions 76. The arms 76 may be constructed of a plastic, metal alloy, carbon fiber, or another material with similar mechanical properties. However, in a preferred embodiment it may be advantageous to have the arms 76 constructed of a light yet rigid and durable material to reduce the load on the motor while still having sufficient rigidity to push an object 16 around the rotary base 72. The hub assembly 74 may be configured to be operably attached to the motor 80, wherein the motor 80 is configured to rotate the hub assembly 74. The arms 76 may be curved, bent, or angled to grab, secure, or hook a prize that has been dropped/placed on the rotary base 72. For example, the arm may be curved so as to cradle a round prize/object 16 such as a ball or disk and move it about the rotary base 72 as the hub assembly 74 is rotated. In one embodiment, a low RPM motor 80 may be utilized to allow for the RFID reader 82 to read an RFID tag or marker 102 attached to a prize 16 or ticket roll 100.

Figure 2:
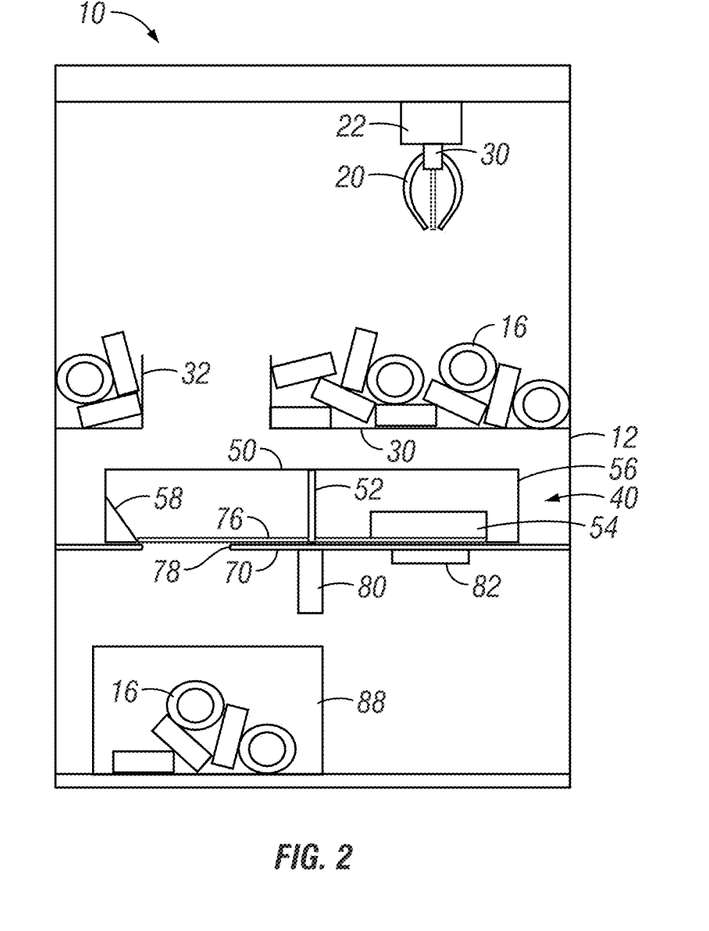
FIG. 2 is a cross-sectional representation of a crane-style game according to one embodiment of the present invention with the crane in a resting position before game play.
Figure 4:
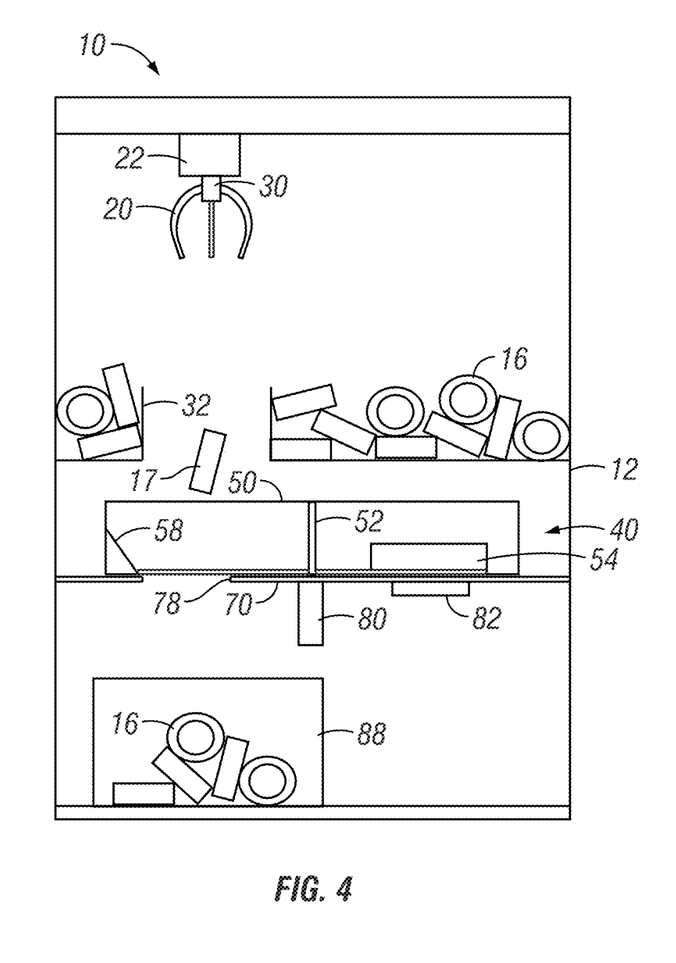
FIG. 4 is the crane-style game of FIG. 3 wherein the crane has dropped the prize.
Figure 5:
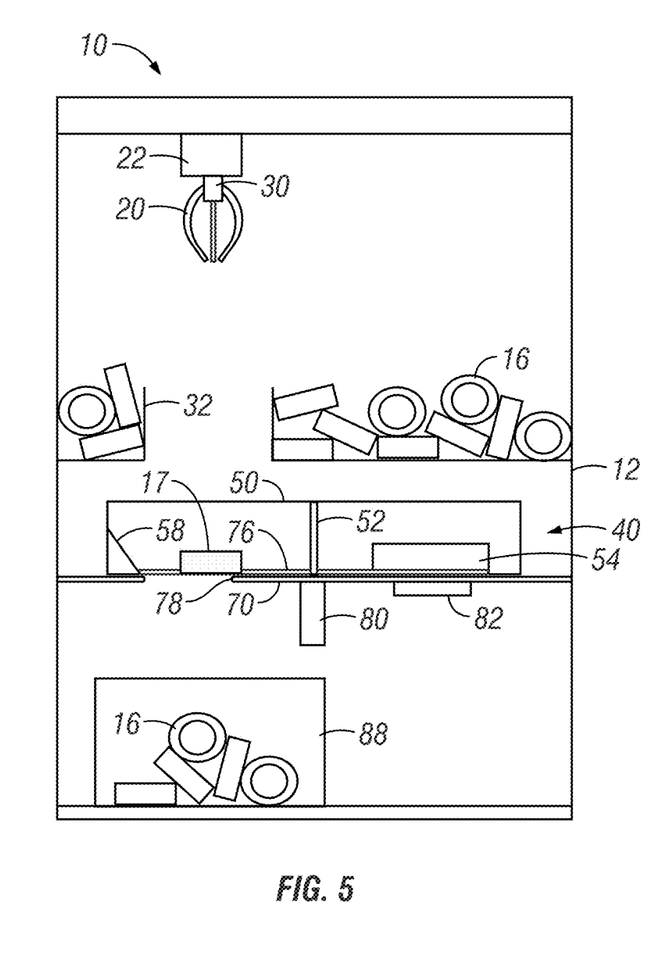
FIG. 5 is the crane-style game of FIG. 4 wherein the dropped prize is resting on a rotary table base.
Figure 6:
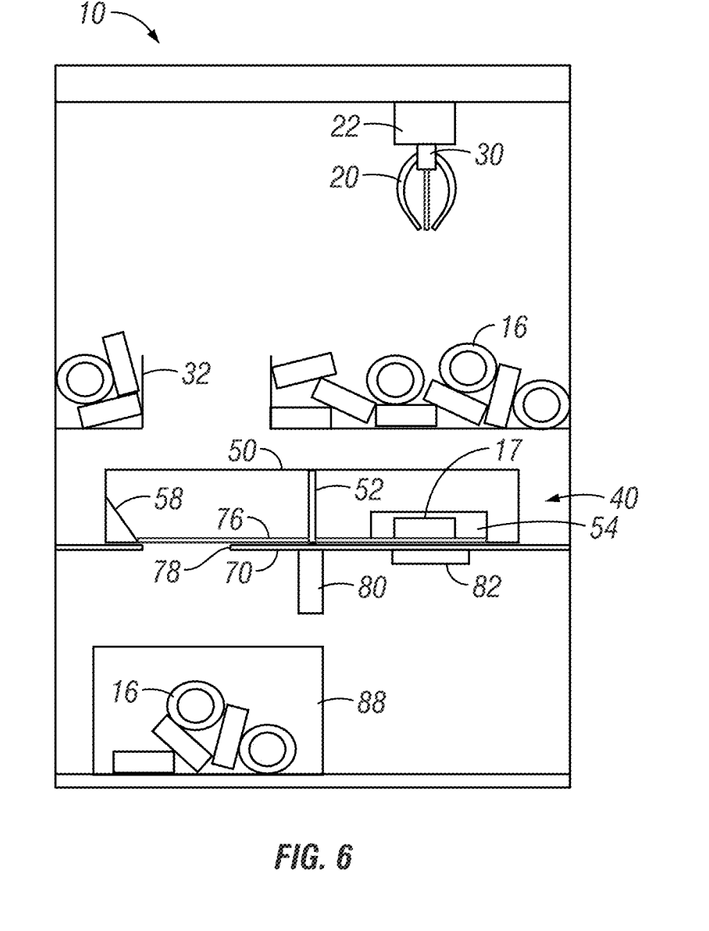
FIG. 6 is the crane-style game of FIG. 5 wherein the rotary table has rotated such that the dropped prize is in close proximity to the RFID reader.
Figure 7:
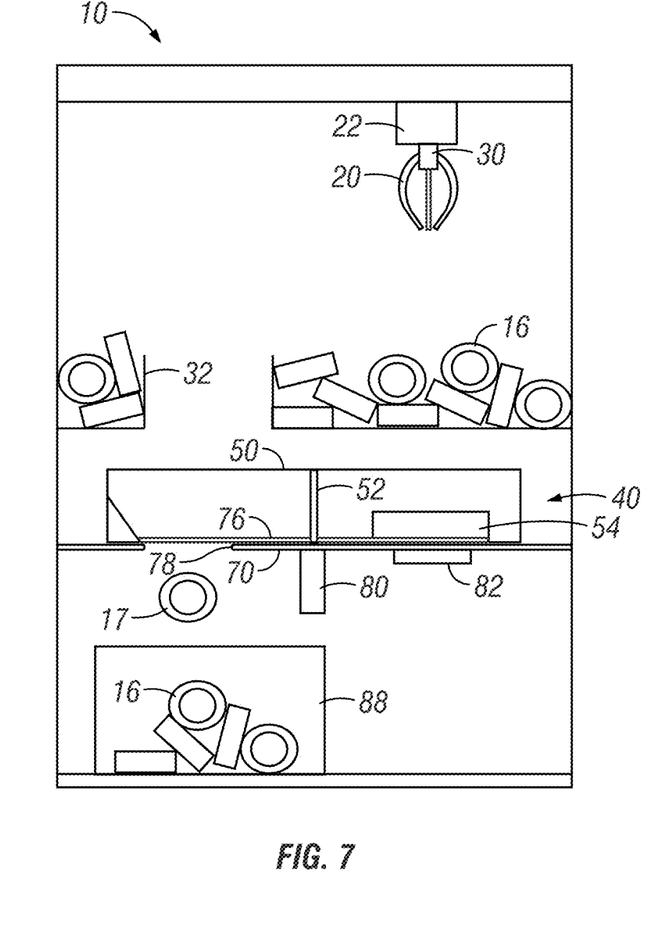
FIG. 7 is the crane-style game of FIG. 6, wherein the rotary table has rotated even further to drop the dropped prize towards a storage area.
Figure 8:
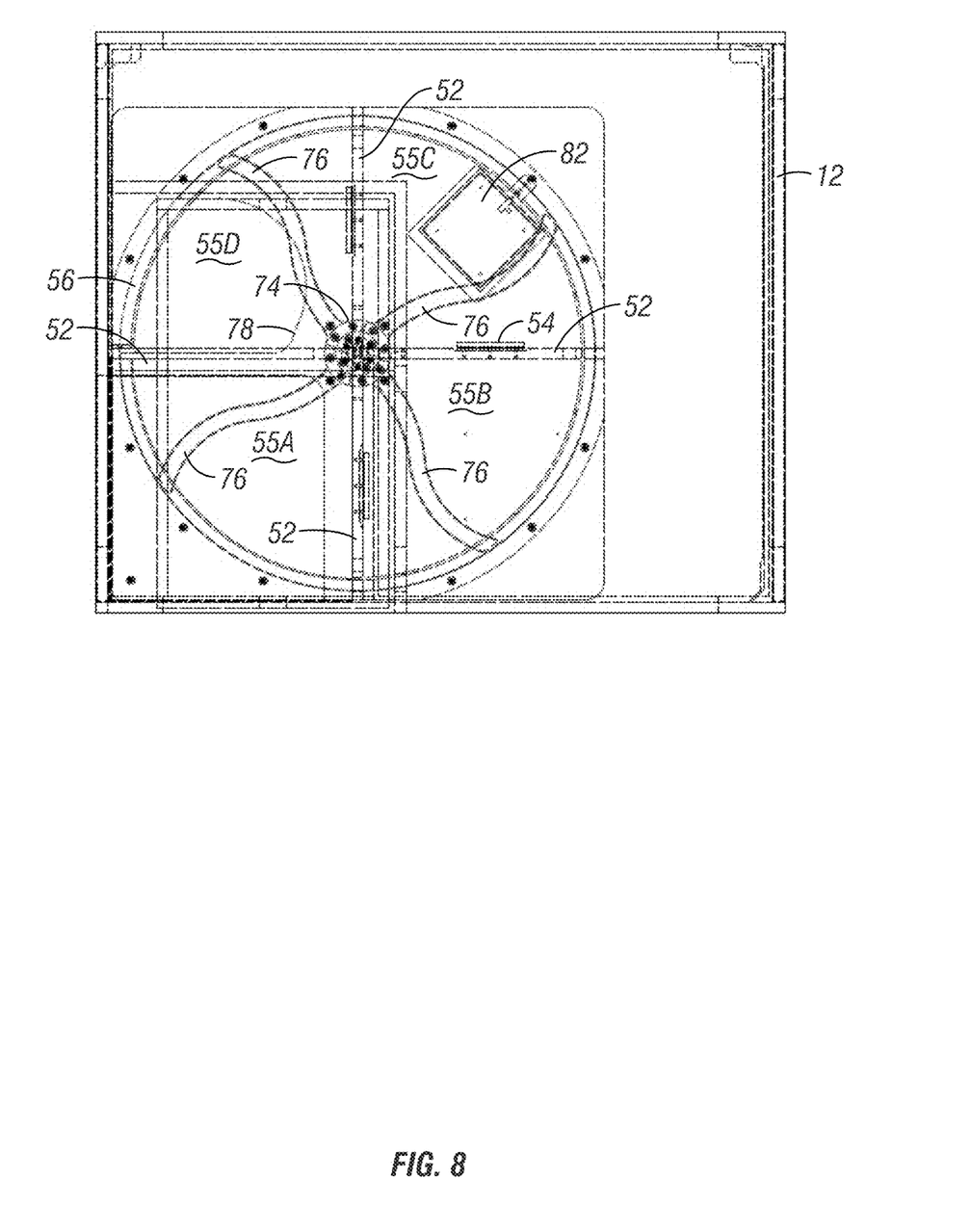
FIG. 8 is a lower plan view of a rotary table according to one embodiment of the present invention.

In FIG. 2, the game 10 is in a default resting position, ready for play. The claw or grabbing mechanism 20 is above the prizes 16. The prizes rest on a floor 30. In FIG. 3, the grabbing mechanism 20 has grasped a selected prize 17 and moved it over an opening 32 through the floor 30. In FIG. 4, the grabbing mechanism 20 has released the selected prize 17 so that it drops through opening 32 toward the rotary unit 40, specifically toward quadrant 55A formed by walls 52 on the rotary guide 50. In FIG. 4, the selected prize 17 is resting on the platform 70 (or rotary base 72) in the first quadrant 55A. In FIG. 5, the rotary arm 76 has been rotated by motor 80 to move the selected prize 17 through the cut-out in the wall 52. The curved shape of the arms 76 urges the prize 17 into alignment with the cut-out. The cut-out will orient the prize 17 by knocking it flat on the platform 70 and in case two (or more) prizes were dropped, will singulate the prizes. In FIG. 6, the arms 76 have rotated the prize 17 further into alignment with the RFID reader 82. The RFID reader 82 will read the prize value from the RFID tag 102. In FIG. 7, the rotary arms 76 have been rotated to move the selected prize over the aperture 78 in the fourth quadrant 55D such that the selected prize 17 falls into a storage area 88. Periodically, the selected prizes 17 can be emptied back into the playing area.

In one example embodiment, in operation, the user may insert money, coins, or may swipe a card through the reader 94 to activate the game 10. The user may then utilize their skill to manipulate the grabber mechanism 20 about an x-y plane within the chamber 14 to position the grabber 20 above the users identified target/prize 16. For example, the user may attempt to grab one or more ticket rolls 100 positioned within the chamber 14. The user may have a predefined or limited amount of time within which to position the grabber 20 before the grabber 20 is activated to attempt to grab the prize 16 or roll 100. It should be understood that the prize 16 and ticket roll 100 may be used interchangeably. They both represent the target item(s) placed within the chamber 14 of the game 10 that the user attempts to grab with the grabber 20. Once the user has positioned the crane using arrow keys or a joy stick 26, the user may press a button 26 to activate the grabber mechanism 20. The grabber 20 will extend down toward the ticket roll 100 and attempt to collect one or more rolls 100. An example method and apparatus for grabbing the prize 16 and/or ticket rolls 100 is described in greater detail in U.S. Pat. No. 6,283,475, which is herein incorporated in its entirety. If the user is successful in collecting one or more rolls 100 with the grabber 20, the crane 22 will lift the rolls 100 and return the crane 22 to the start position. In a game that includes the rotary unit 40 described above, the start position may be located above the first quadrant 55A of the rotary table guide 42. The roll(s) 100 may then be released by the grabber 20 and dropped and funneled into the first quadrant by the angled portion 58 of the rotary table guide 42, where the rolls would be positioned on top of the rotary base 72. The motor 80 may then be activated to rotate the hub assembly 74 and arms 76. The arms 76 may push the roll(s) 100 under the door of the first interior wall 52 that the roll(s) 100 approach, the hinged door 54 may tip over or knock down any ticket rolls 100 that are standing on end. This will insure that the roll(s) 100 are laying flatly on the rotary base 72 as they move along the base 72. Additional interior walls 52 and hinged doors 54 may be utilized to insure all rolls 100 lay flat on the base 72. As the arms 76 move the rolls 100 along the base 72, the rolls will pass over a sensor, antenna, or RFID reader that will scan the RFID tag 102 or other marking device that is attached to each of the rolls 100. A controller or computer may then be configured to add up and/or display the total number of ticket rolls 100 collected. The roll(s) 100 may continue along the base 72 until it reaches the aperture 78 in the floor 70 of the rotary table 44. The ticket roll(s) 100 will then be sent down a chute.

Traditional crane-style arcade games have included an outlet or collection zone where a user could collect any prizes that were won while playing the game. For example, a player may successfully grab a stuffed animal and the crane 22 would release the stuffed animal down a chute to a collection zone 28 where the user could collect their prize 16. It should be understood that the present invention may also be operated in a similar manner wherein the ticket roll(s) may pass through the aperture 78 in the floor 70 of the rotary table 44, where the roll(s) 100 may then be collected by the user. However, it should also be understood that in an alternative embodiment that ticket roll(s) 100 may not be presented to or collected by the user. In this embodiment, the ticket roll(s) 100 may be collected in the bottom portion of the game cabinet 12 that may not be accessed by the user. The points associated with the values of the ticket rolls 100 grabbed by the user may be awarded by placing the points on a card with a magnetic strip. A paper receipt may also be printed with a barcode and/or the amount of points/tickets won by the user. The receipt and/or card may then be taken to the owner/operator of the game to be exchanged for a prize or other item of value. One advantage of this particular method of awarding prizes is that the ticket rolls 100 never leave the game cabinet, therefore that user cannot lose or misplace the ticket roll(s), which the operator would then need to replace. The operator would simply need to open up the game cabinet 12 and place the winning ticket rolls 100 from the lower portion of the cabinet 12 back into the chamber 14.

In an alternative embodiment, once the ticket roll(s) 100 or prize(s) 16 have been identified by the RFID reader, the ticket roll(s) 100 or prize(s) 16 may be placed back in the chamber. This may be accomplished by attaching a chute, fulcrum, elevator, escalator, or similar mechanism to the rotary unit 40, wherein once the item(s) 100 has passed by and been identified by the RFID reader, the chute, escalator, elevator, etc. will place the item(s) 100 back in the chamber 14 and ready for the next game by a user.

Figure 11:
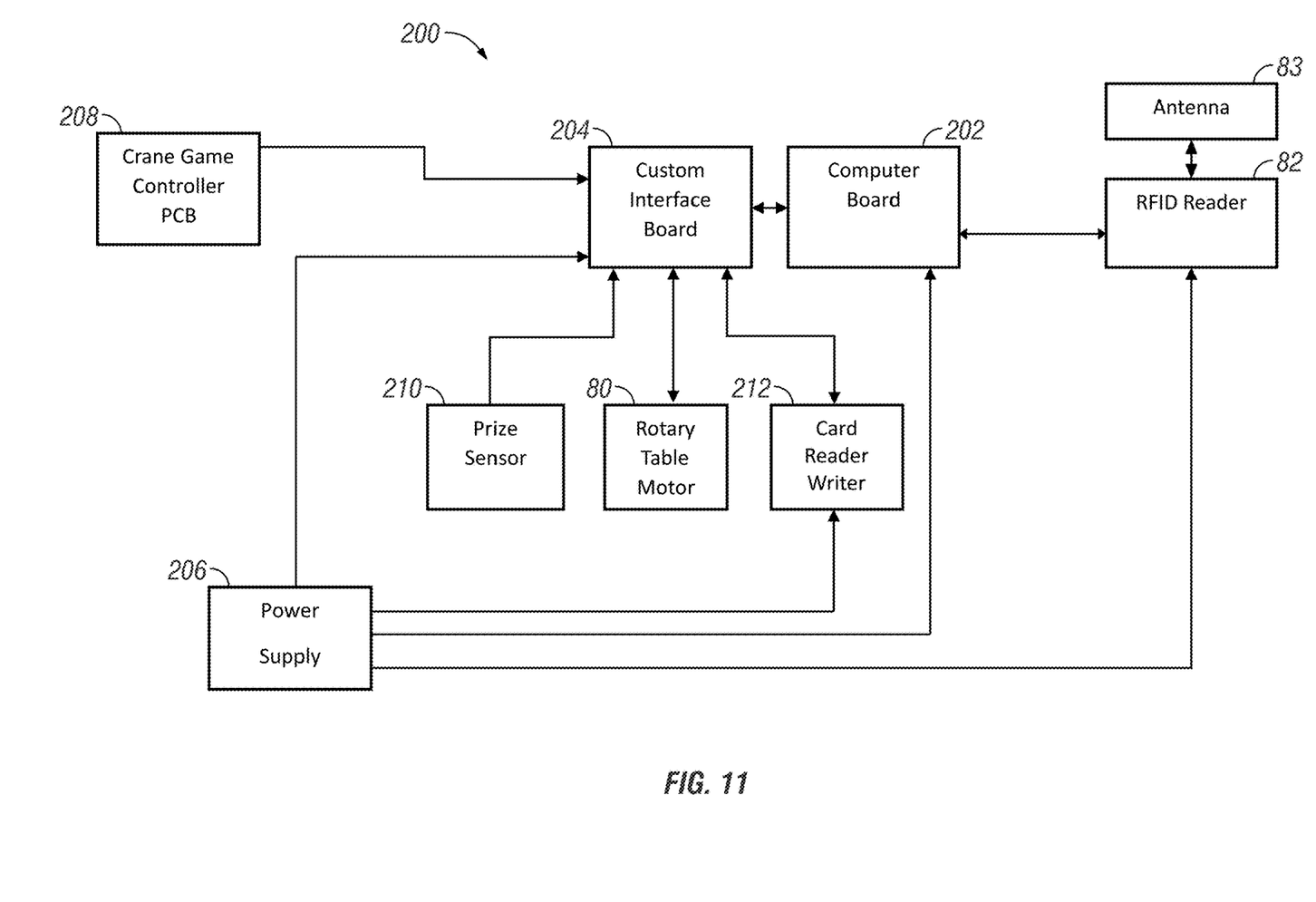
FIG. 11 is a system block diagram for a crane-style game according to one embodiment of the present invention.
Figure 12:
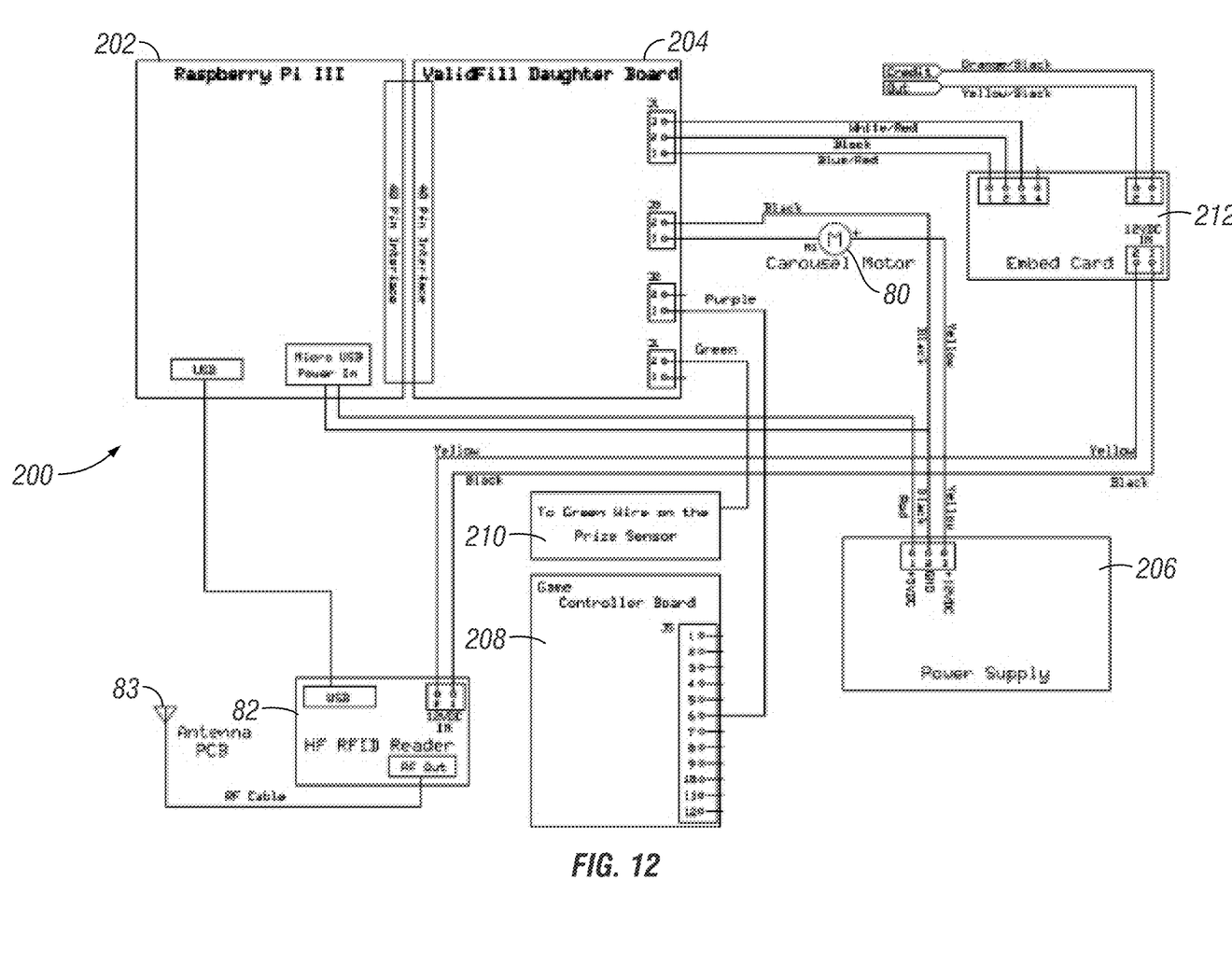
FIG. 12 is an electronics diagram for a crane-style game including RFID game according to one embodiment of the present invention.
Figure 13:
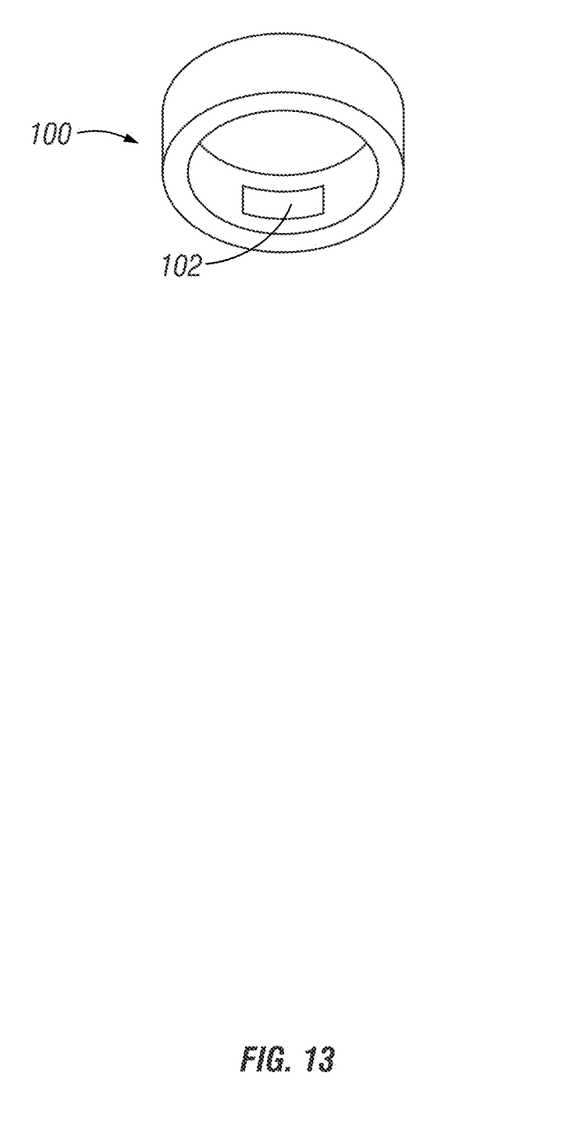
FIG. 13 is a perspective view of a ticket roll with RFID tag for use as a prize in a crane-style game.

FIG. 11 shows a block diagram of the electronic components 200 of the game 10 according to one embodiment. The components are controlled by a primary computer board 202 and a custom interface board 204. The primary computer board may be a programmable computer with a forty-pin interface, such as one manufactured under the brand name Raspberry Pi III. The interface board 204 may act as a daughter board to interface between the game components and the primary board 202. A power supply 206 is used to supply power to the various components. The power supply 206 may include a rectifier to convert an AC input to a DC output. In one embodiment the power supply 206 may provide outlets twelve (12) volts and five (5) volts. The controller 208 connects to the interface board 204 to provide an input of the status of the crane game. Additionally, a prize sensor 210 that is part of a standard game provides an input to the interface board 204 to provide a signal when a prize 16 has been won. The computer boards 202 and 204 in response to the signal that a prize has been won cause the rotary table motor 80 to rotate a full revolution to move the selected prize 17 past the RFID reader 82 and eventually to the opening 78 that leads to the storage area 88. The antenna 83 of the RFID reader 82 reads the RFID tag 102 on the prize 17 and provides a signal to the RFID reader 82 that relays a signal the computer board 202 indicating the point or ticket value of the selected prize 17. The computer board 202 may accumulate a total value of points or tickets won during a turn. The custom interface board 204 may then relay the total point or ticket value to a card reader/writer that can transfer the point or ticket value to a user's card, for example a magnetic strip card. FIG. 12 shows a wiring diagram of the electronic components 200.

The present invention contemplates numerous variations, options and alternatives, and is not to be limited to the specific embodiments described herein. Other changes are considered to be part of the present invention.

What is claimed is:

1. A crane-style arcade game comprising:
   a housing;
   an enclosed prize chamber in the housing including a floor for supporting prizes, wherein the prizes comprise RFID tags with assigned point values;
   a grabber mechanism suspended above the floor;
   a controller located externally on the housing having a connection to the grabber mechanism to permit a player to control a position of the grabber mechanism above the floor whereby the player attempts to capture a prize from the prize chamber with the grabber mechanism and move the prize into an opening in the floor;
   an RFID reader associated with the opening in the floor to read the RFID tag on a captured prize as the captured prize is moved past the RFID reader; and
   a recording device connected to the RFID reader to record the assigned point values of the RFID tags of captured prizes read by the RFID reader a captured-prize storage area below the floor; and a delivery passage within the housing in communication between the opening in the floor and the captured-prize storage area,
   a rotary unit within the delivery passage, said rotary unit positioned in communication with the opening in the floor to move the captured prizes past the RFID reader towards the captured-prize storage area, the rotary unit further comprises a rotary table guide, said rotary table guide comprising: a rotary guide base having an aperture proximate to the center of the rotary guide base; one or more interior walls positioned within the aperture of the rotary guide base, said interior walls configured to define the aperture into quadrants; one or more doors operatively attached to the one or more interior walls; an exterior wall attached proximate to an outer edge of the aperture; and a sloped portion of the rotary guide base, said sloped portion configured to funnel a captured prize to the aperture.

2. The crane-style arcade game of claim 1, wherein the grabber mechanism is adapted to move the prize into the opening in the floor by dropping the prize into the opening.

3. The crane-style arcade game of claim 2, wherein the controller is adapted to cause the grabber mechanism to drop the prize into the opening by releasing the prize from the grabber mechanism.

4. The crane-style arcade game of claim 1, wherein the captured-prize storage area is entirely enclosed within the housing.

5. The crane-style arcade game of claim 1, wherein the rotary unit further comprises a rotary base, said rotary base comprising:
 a rotary table base;
 a motor;
 a hub assembly positioned above the rotary base and operatively attached to the motor; and
 one or more arms extending from the hub assembly.

6. The crane-style arcade game of claim 1, wherein the rotary unit includes a motor that is configured to rotate a hub assembly to move the captured prize about a rotary table, whereby the RFID reader reads the RFID tag on the captured prize.

7. The crane-style arcade game of claim 1, wherein the recording device is adapted to record point values to a user's memory card.

8. The crane-style arcade game of claim 1, wherein the prizes comprise rolls of tickets.

9. The crane-style arcade game of claim 8, wherein the point value assigned to each RFID tag corresponds with a number of tickets in the ticket roll to which the RFID tag is attached.

10. The crane-style game of claim 1, wherein the grabber mechanism comprises a claw.

\* \* \* \* \*